United States Patent
Zhu

(10) Patent No.: US 11,164,024 B2
(45) Date of Patent: Nov. 2, 2021

(54) METHOD, APPARATUS AND STORAGE MEDIUM FOR CONTROLLING IMAGE ACQUISITION COMPONENT

(71) Applicant: BEIJING XIAOMI MOBILE SOFTWARE CO., LTD., Beijing (CN)

(72) Inventor: Nengjin Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 58 days.

(21) Appl. No.: 16/686,135

(22) Filed: Nov. 16, 2019

(65) Prior Publication Data

US 2020/0401830 A1    Dec. 24, 2020

(30) Foreign Application Priority Data

Jun. 24, 2019  (CN) .......................... 201910550782.9

(51) Int. Cl.
*G06K 9/20* (2006.01)
*H04M 1/02* (2006.01)

(52) U.S. Cl.
CPC .......... *G06K 9/209* (2013.01); *H04M 1/0264* (2013.01)

(58) Field of Classification Search
CPC ................ G06K 9/209; H04M 1/0264; H04M 1/72454; H04M 1/0237; H04M 2250/52; H04M 2250/12; G03B 17/04; H04N 5/2251; H04N 5/232; G06F 1/1686
See application file for complete search history.

(56) References Cited

U.S. PATENT DOCUMENTS

| 2012/0113279 A1* | 5/2012 | Park ................... H04N 5/23296 348/208.6 |
| 2015/0054908 A1* | 2/2015 | Lee ........................ H04N 7/141 348/14.01 |
| 2018/0041701 A1* | 2/2018 | Yanagi ............... H04N 5/23258 |

FOREIGN PATENT DOCUMENTS

| CN | 103619056 A | 3/2014 |
| CN | 104460936 A | 3/2015 |
| CN | 104461311 A | 3/2015 |
| CN | 107783710 A | 3/2018 |
| CN | 108390964 A | 8/2018 |
| CN | 109089023 A | 12/2018 |
| GB | 2416036 A | 1/2006 |

OTHER PUBLICATIONS

European Search Report in the European application No. 19211772.9, dated Feb. 5, 2020.

\* cited by examiner

*Primary Examiner* — Christopher M Brandt
(74) *Attorney, Agent, or Firm* — Syncoda LLC; Feng Ma

(57) ABSTRACT

A method for controlling an image acquisition component includes: when a terminal including a movable image acquisition component receives an activating instruction for the image acquisition component, acquired data acquired by a Proximity Sensor (P-sensor) is obtained, the image acquisition component being capable of moving in and out of the terminal under driving of a driving component of the terminal; it is determined whether there is an obstacle in a preset range of the terminal based on the acquired data; and when there is the obstacle in the preset range of the terminal, the activating instruction is forbidden to be executed, and the image acquisition component is kept at a first position in the terminal.

17 Claims, 11 Drawing Sheets

METHOD, APPARATUS AND STORAGE MEDIUM FOR CONTROLLING IMAGE ACQUISITION COMPONENT

CROSS-REFERENCE TO RELATED APPLICATION

This application claims priority to Chinese Patent Application No. 201910550782.9, filed on Jun. 24, 2019, the disclosure of which is hereby incorporated by reference in its entirety.

BACKGROUND

Along with improvement of functions of image acquisition components, for example, cameras, of terminals, more and more users select cameras of terminals for image acquisition. At present, cameras of most terminals are fixedly embedded into the terminals and may occupy areas of screens of the terminals. To avoid such case, a telescopic camera is designed. The telescopic camera may move out of a shell of a terminal for image acquisition when there is an image acquisition requirement, and may also be positioned and concealed in the shell of the terminal when there is no image acquisition requirement.

SUMMARY

The present disclosure generally relates to a computer communication technology, and more specifically to a method and device for controlling an image acquisition component and a storage medium.

This summary is provided to introduce a selection of aspects of the present disclosure in a simplified form that are further described below in the Detailed Description. This summary is not intended to identify key features or essential features of the claimed subject matter, nor is it intended to be used to limit the scope of the claimed subject matter.

According to a first aspect of embodiments of the present disclosure, a method for controlling an image acquisition component is provided, which may include that: when a terminal including a movable image acquisition component receives an activating instruction for the image acquisition component, acquired data acquired by a Proximity Sensor (P-sensor) is obtained, the image acquisition component being capable of moving in and out of the terminal under driving of a driving component of the terminal; it is determined based on the acquired data whether there is an obstacle in a preset range of the terminal; and when there is the obstacle in the preset range of the terminal, the activating instruction is forbidden to be executed, and the image acquisition component is kept at a first position in the terminal.

According to a second aspect of the embodiments of the present disclosure, a device for controlling an image acquisition component is provided, which may include: a first acquisition portion, configured to obtain, when a terminal including a movable image acquisition component receives an activating instruction for the image acquisition component, acquired data acquired by a P-sensor, the image acquisition component being capable of moving in and out of the terminal under driving of a driving component of the terminal; a determination portion, configured to determine whether there is an obstacle in a preset range of the terminal based on the acquired data; and a first driving portion, configured to, when there is the obstacle in the preset range of the terminal, forbid the activating instruction to be executed and keep the image acquisition component at a first position in the terminal.

According to a third aspect of the embodiments of the present disclosure, a device for controlling an image acquisition component is provided, which may include: a processor; and a memory configured to store an instruction executable for the processor; wherein the processor may be configured to implement operations of the method for controlling an image acquisition component in the abovementioned embodiments.

According to a fourth aspect of the embodiments of the present disclosure, a non-transitory computer-readable storage medium is provided. An instruction in the storage medium is executed by a processor of a device for controlling an image acquisition component to enable the device to implement the method for controlling an image acquisition component in the abovementioned embodiments.

The technical solutions provided by embodiments of the present disclosure may have the following beneficial effects.

It may be seen from the abovementioned embodiments that, in the present disclosure, when it is detected that there is an obstacle in the preset range of the terminal including the image acquisition component, the image acquisition component may be kept at the first position in the terminal to reduce the occurrence of moving the image acquisition component out in unnecessary cases, so that not only reduction of damage to the image acquisition component, but also reduction of a misoperation rate may be achieved.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

For example, a movable image acquisition component included in a terminal is a telescopic camera. If a user places the terminal in a bag or a pocket and when a command of activating the telescopic camera is received, the telescopic camera may move out of the terminal. In such case, the camera may be damaged easily.

The embodiments of the present disclosure provide a method for controlling an image acquisition component. When it is detected that a terminal including an image acquisition component is covered, the image acquisition component may be forbidden to move out to reduce the circumstance that the image acquisition component moves out in unnecessary cases, thereby achieving not only reduction of damage to the image acquisition component, but also reduction of a misoperation rate.

Figure 1:
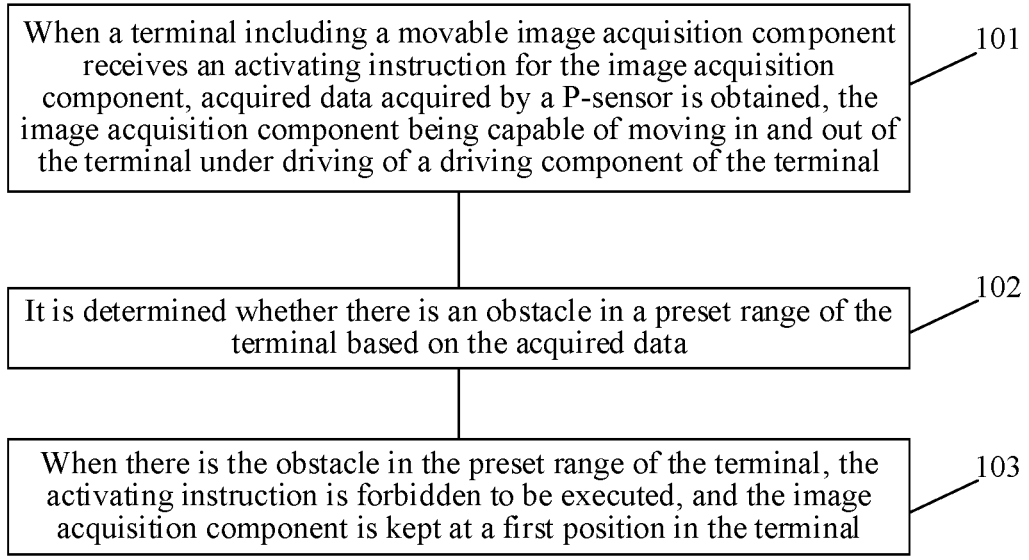
FIG. 1 is a first flowchart illustrating a method for controlling an image acquisition component according to some embodiments of the present disclosure.

The embodiments of the present disclosure provide a method for controlling an image acquisition component. FIG. 1 is a first flowchart illustrating a method for controlling an image acquisition component, according to some embodiments of the present disclosure. As illustrated in FIG. 1, the method mainly includes the following blocks.

In Block 101, when a terminal including a movable image acquisition component receives an activating instruction for the image acquisition component, acquired data acquired by a P-sensor is obtained, the image acquisition component being capable of moving in and out of the terminal under driving of a driving component of the terminal.

The movable image acquisition component may be a telescopic camera, a turnable camera or a camera moving in another manner. The activating instruction for the image acquisition component may be received from an Application (APP) with an image acquisition function. In the embodiment, acquired data of a proximity object around the terminal is acquired via the P-sensor on the terminal. The acquired data may be a distance between the proximity object and the terminal, and the P-sensor may be a distance sensor. The P-sensor may obtain the acquired data according to a real-time acquisition manner or according to a set period. In the embodiment, the P-sensor may be arranged at a set position, for example, a position relatively close to the image acquisition component, to obtain the acquired data more accurately.

In Block 102, it is determined whether there is an obstacle in a preset range of the terminal based on the acquired data.

It may be determined whether there is the obstacle in the preset range of the terminal including the image acquisition component based on the acquired data obtained by the P-sensor. The obstacle may be an object that may stop the camera from moving out or damage the camera. For example, when the terminal is positioned in a pocket of a user, the pocket and an item in the pocket may be obstacles.

In Block 103, when there is the obstacle in the preset range of the terminal, the activating instruction is forbidden to be executed, and the image acquisition component is kept at a first position in the terminal.

In the embodiment, the preset range may be a distance range of the obstacle relative to the mobile terminal. The distance between the obstacle and the mobile terminal may be less than a distance between the mobile terminal and an acquired object. For example, when the image acquisition component is adopted to take a selfie, the user is the acquired object, and the obstacle may be closer to the mobile terminal than the user. For example, compared to the user, the paper covering the mobile terminal is closer to the mobile terminal.

When it is determined that there is the obstacle in the preset range of the terminal, the activating instruction is forbidden to be executed, and the image acquisition component is kept at the first position in the terminal, namely the image acquisition component is controlled not to move out of the terminal. The APP with the image acquisition function may be an APP capable of sending the activating instruction, such as WeChat, Facetime or the like.

In the embodiment, when it is detected that there is an obstacle in the preset range of the terminal including the image acquisition component, the image acquisition component may be kept at the first position in the terminal to reduce the occurrence of moving the image acquisition component out in unnecessary cases. The P-sensor is reused for obstacle detection, so that no additional structure is required to be introduced in the mobile terminal, and the mobile terminal has the characteristic of simple and ingenious structure.

Figure 2:
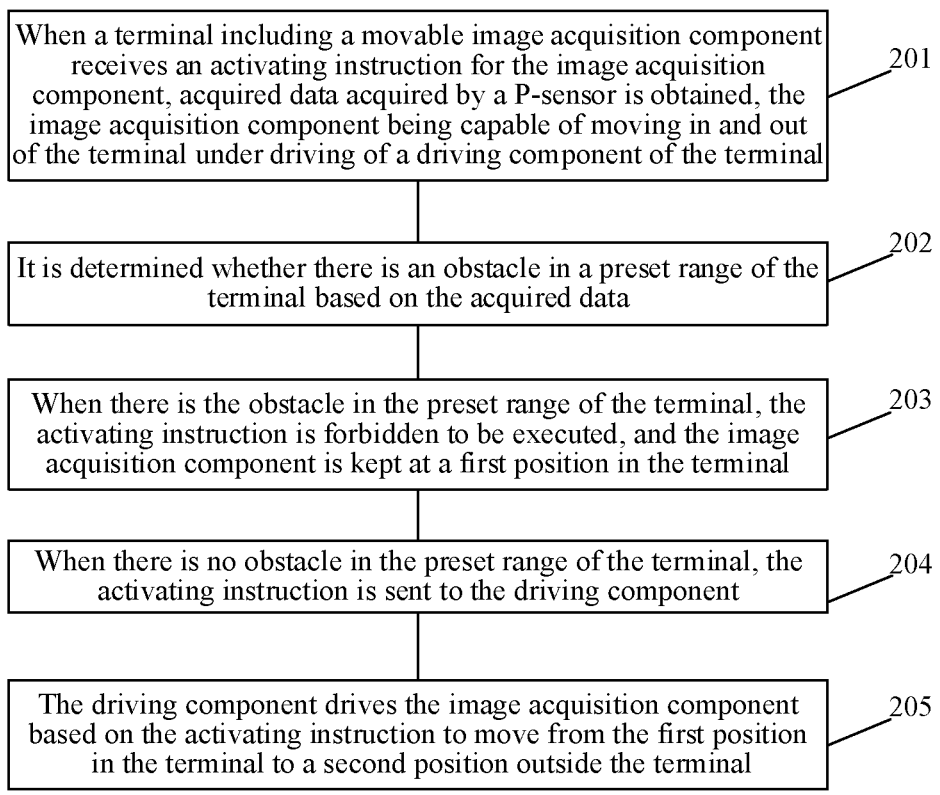
FIG. 2 is a second flowchart illustrating a method for controlling an image acquisition component according to some embodiments of the present disclosure.

FIG. 2 is a second flowchart illustrating a method for controlling an image acquisition component, according to some embodiments of the present disclosure. As illustrated in FIG. 2, the method mainly includes the following blocks.

In Block 201, when a terminal including a movable image acquisition component receives an activating instruction for the image acquisition component, acquired data acquired by a P-sensor is obtained, the image acquisition component being capable of moving in and out of the terminal under driving of a driving component of the terminal.

In Block 202, it is determined whether there is an obstacle in a preset range of the terminal based on the acquired data.

In Block 203, when there is the obstacle in the preset range of the terminal, the activating instruction is forbidden to be executed, and the image acquisition component is kept at a first position in the terminal.

In Block 204, when there is no obstacle in the preset range of the terminal, the activating instruction is sent to the driving component.

The driving component may be a motor. That is, when the activating instruction for the image acquisition component is received and there is no obstacle in the preset range of the terminal, the activating instruction is sent to the motor.

In Block 205, the driving component drives the image acquisition component based on the activating instruction to move from the first position in the terminal to a second position outside the terminal.

Here, taking the driving component to be the motor as an example, when the activating instruction is received, the motor may drive the image acquisition component based on the activating instruction to move from the first position in the terminal to the second position outside the terminal.

The first position is an original position of the image acquisition component in the terminal, and the second position is a position to which the image acquisition component moves according to the received activating instruction. An opening is arranged in a shell of the mobile terminal, and the image acquisition component may move between the first position and the second position through the opening. When the image acquisition component is located at the first position, a top of the image acquisition component may be flush with the shell of the mobile terminal, namely the top of the image acquisition component may form a part of a certain outer surface of the image acquisition component. Therefore, on one hand, the outer surface of the mobile terminal has a better integrity when the image acquisition component is positioned in the shell of the mobile terminal; and on the other hand, damage of dust entering the terminal through the opening and the like is reduced.

Figure 3:
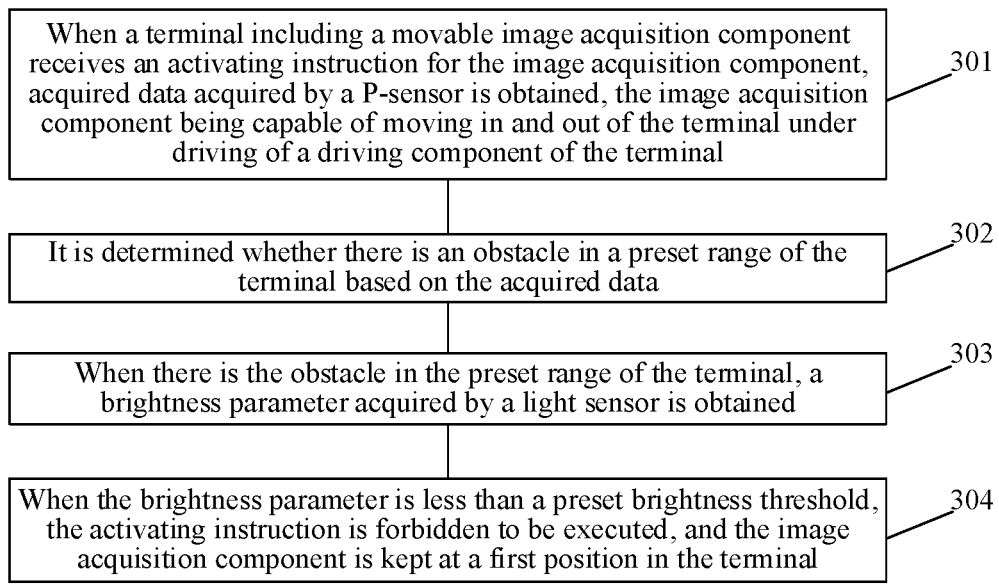
FIG. 3 is a third flowchart illustrating a method for controlling an image acquisition component according to some embodiments of the present disclosure.

FIG. 3 is a third flowchart illustrating a method for controlling an image acquisition component, according to some embodiments of the present disclosure. As illustrated in FIG. 3, the method mainly includes the following blocks.

In Block 301, when a terminal including a movable image acquisition component receives an activating instruction for the image acquisition component, acquired data acquired by a P-sensor is obtained, the image acquisition component being capable of moving in and out of the terminal under driving of a driving component of the terminal.

In Block 302, it is determined whether there is an obstacle in a preset range of the terminal based on the acquired data.

In Block 303, when there is the obstacle in the preset range of the terminal, a brightness parameter acquired by a light sensor is obtained.

When it is determined that there is an obstacle in the preset range of the terminal, the brightness parameter of a present environment in the preset range of the terminal may be acquired via the light sensor on the terminal.

In Block 304, when the brightness parameter is less than a preset brightness threshold, the activating instruction is forbidden to be executed, and the image acquisition component is kept at a first position in the terminal.

The acquired brightness parameter may be compared with the preset brightness threshold to determine whether the present brightness parameter is less than the preset brightness threshold. If the present brightness parameter is less than the preset brightness threshold, it is determined that the present ambient brightness is less than normal brightness and that the terminal is actually covered by the obstacle. Therefore, the activating instruction is forbidden to be executed, and the image acquisition component is kept at the first position in the terminal.

If the present brightness parameter is greater than the preset brightness threshold, it is determined that the present ambient brightness is normal and that the terminal is covered by the obstacle due to a misoperation. Then, the activating instruction is sent to the driving component. The driving component drives the image acquisition component based on the activating instruction to move from the first position in the terminal to a second position outside the terminal.

In the embodiment, when it is determined that there is an obstacle in the preset range, a further determination is made based on the brightness parameter acquired by the light sensor, so that occurrence of misoperations may be reduced, and accuracy of the determination is further improved. The P-sensor and the light sensor are reused for obstacle detection, so that no additional structure is required to be introduced, and the mobile terminal has the characteristic of simple and ingenious structure.

Figure 4:
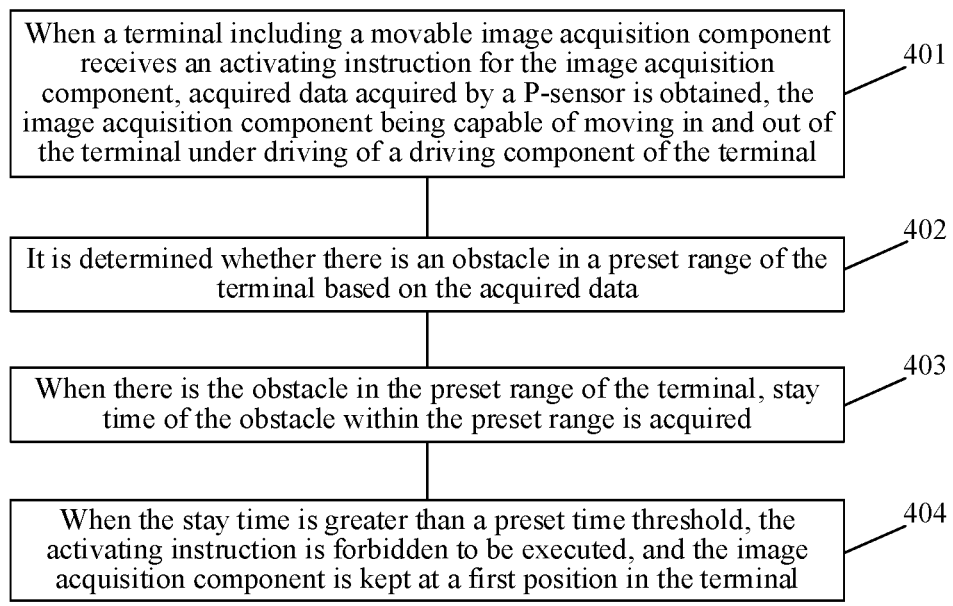
FIG. 4 is a fourth flowchart illustrating a method for controlling an image acquisition component according to some embodiments of the present disclosure.

FIG. 4 is a fourth flowchart illustrating a method for controlling an image acquisition component, according to some embodiments of the present disclosure. As illustrated in FIG. 4, the method mainly includes the following blocks.

In Block 401, when a terminal including a movable image acquisition component receives an activating instruction for the image acquisition component, acquired data acquired by a P-sensor is obtained, the image acquisition component being capable of moving in and out of the terminal under driving of a driving component of the terminal.

In Block 402, it is determined whether there is an obstacle in a preset range of the terminal based on the acquired data.

In Block 403, when there is the obstacle in the preset range of the terminal, stay time of the obstacle within the preset range is obtained.

When it is determined that there is an obstacle in the preset range of the terminal, the stay time of the obstacle within the preset range may be acquired to determine whether a misoperation occurs.

In Block 404, when the stay time is greater than a preset time threshold, the activating instruction is forbidden to be executed, and the image acquisition component is kept at a first position in the terminal.

The preset time threshold may be set as required and compared with the stay time to further determine whether the misoperation occurs. For example, the preset time threshold is 0.5 millisecond. If the obtained stay time of the obstacle within the preset range is 0.7 millisecond, as 0.7 millisecond is greater than 0.5 millisecond, it is determined that no misoperation occurs, and in such case, it is necessary to forbid the activating instruction to be executed and keep the image acquisition component at the first position in the terminal. When the obtained stay time of the obstacle within the preset range is 0.2 millisecond, as 0.2 millisecond is less than 0.5 millisecond, it is determined that the misoperation occurs, and in such case, it is necessary to execute the activating instruction and drive the image acquisition component to move from the first position to a second position outside the terminal.

In the embodiment, when it is determined that there is an obstacle in the preset range, the stay time of the obstacle within the preset range is further acquired to determine whether the misoperation occurs, so that occurrence of misoperations may be reduced, and accuracy of the determination is further improved.

Figure 5:
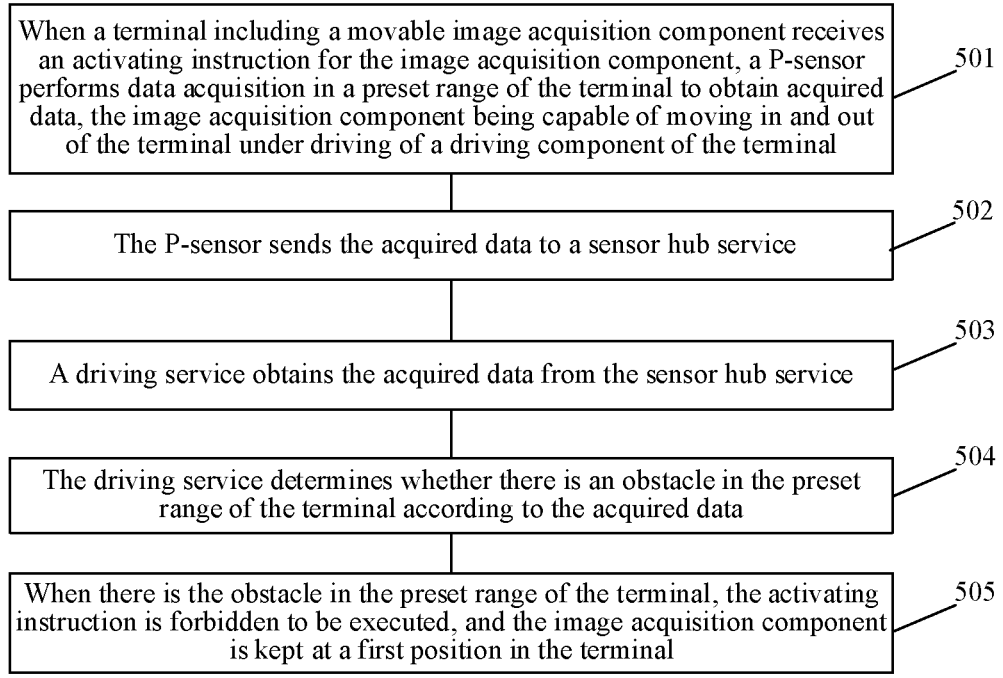
FIG. 5 is a fifth flowchart illustrating a method for controlling an image acquisition component according to some embodiments of the present disclosure.

FIG. 5 is a fifth flowchart illustrating a method for controlling an image acquisition component, according to some embodiments of the present disclosure. As illustrated in FIG. 5, the method mainly includes the following blocks.

In Block 501, when a terminal including a movable image acquisition component receives an activating instruction for the image acquisition component, a P-sensor performs data acquisition in a preset range of the terminal to obtain acquired data, the image acquisition component being capable of moving in and out of the terminal under driving of a driving component of the terminal.

In Block 502, the P-sensor sends the acquired data to a sensor hub service.

The sensor hub service is a combined software and hardware solution based on a low-power-consumption Microcontroller Unit (MCU) and a Real Time Operating System (RTOS), and has a main function of connecting various sensor devices and processing data from various sensor devices.

In Block 503, a driving service obtains the acquired data from the sensor hub service.

The driving service may be configured to process the received instruction and data of the driving component.

In Block 504, the driving service determines whether there is an obstacle in the preset range of the terminal according to the acquired data.

In Block 505, when there is the obstacle in the preset range of the terminal, the activating instruction is forbidden to be executed, and the image acquisition component is kept at a first position in the terminal.

In some embodiments, the operation that the acquired data acquired by the P-sensor is obtained includes the following actions. The P-sensor performs data acquisition in the preset range of the terminal to obtain the acquired data, and sends the acquired data to the sensor hub service. The driving service obtains the acquired data from the sensor hub service. The operation that it is determined whether there is an obstacle in the preset range of the terminal based on the acquired data includes that: the driving service determines whether there is the obstacle in the preset range of the terminal based on the acquired data.

Figure 6:
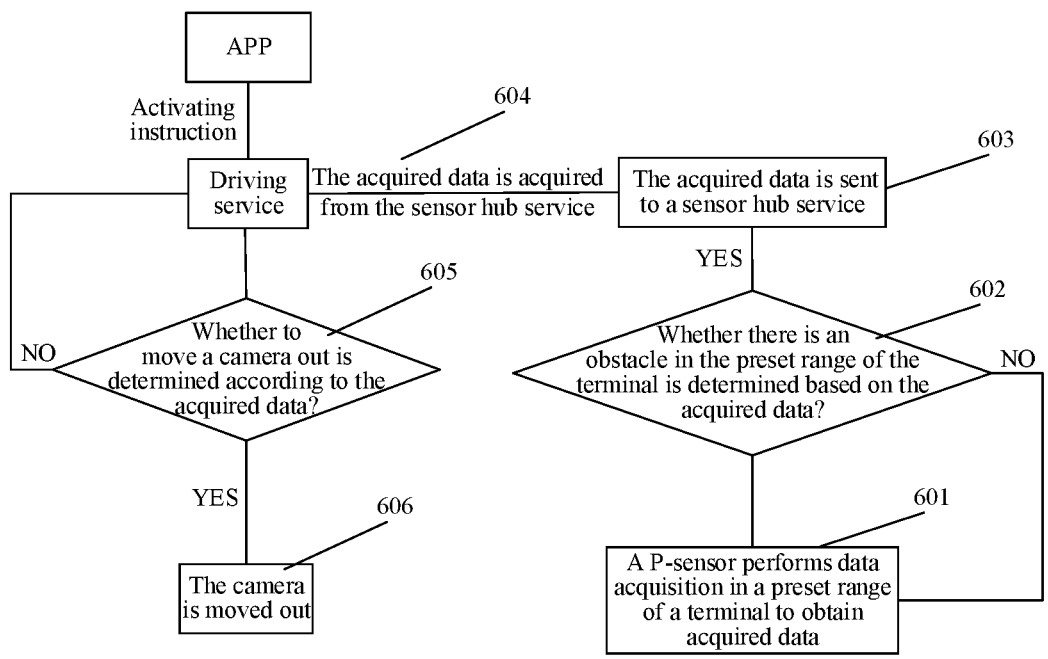
FIG. 6 is a sixth flowchart illustrating a method for controlling an image acquisition component according to some embodiments of the present disclosure.

FIG. 6 is a sixth flowchart illustrating a method for controlling an image acquisition component, according to some embodiments of the present disclosure. As illustrated in FIG. 6, the method mainly includes the following blocks.

In Block 601, a distance sensor (P-sensor) performs data acquisition in a preset range of a terminal to obtain acquired data.

In Block 602, it is determined whether there is an obstacle in the preset range of the terminal based on the acquired data.

In Block 603, when there is the obstacle, the P-sensor sends the acquired data to a sensor hub service.

In Block 604, when a driving service (Motor service) receives an activating instruction for an image acquisition component from an Application (APP), the driving service acquires the acquired data from the sensor hub service.

In Block 605, it is determined whether to move a camera out according to the acquired data.

In Block 606, when it is determined to move the camera out, the camera is moved out (pop-up) based on the activating instruction.

When there is no obstacle in the preset range of the terminal, the activating instruction is executed, and the image acquisition component moves from a first position to a second position outside the terminal. When there is an obstacle in the preset range of the terminal, the activating instruction is forbidden to be executed, and the image acquisition component is kept at the first position in the terminal.

In some embodiments, the terminal includes at least two P-sensors of which orientations of sensing surfaces are different, and the method further includes the following operations. When an image acquisition surface of the image acquisition component faces a first surface, the P-sensor corresponding to the first surface is activated. When it is detected that the image acquisition surface of the image acquisition component turns from the first surface to a second surface, the P-sensor corresponding to the second surface is activated to keep the sensing surface of the P-sensor and the image acquisition surface of the image acquisition component face the same surface.

The image acquisition component may be, for example, a rotatable telescopic camera. The telescopic camera may turn to different directions based on a received control instruction, and correspondingly, the image acquisition surface of the telescopic camera for image acquisition may also have different orientations. The terminal may be arranged with at least two P-sensors of which the orientations of the sensing surfaces are different, so as to correspond to different image acquisition surfaces of the telescopic camera. In an implementation process, when the image acquisition surface of the image acquisition component faces the first surface, the P-sensor corresponding to the first surface may be activated.

When it is detected that the image acquisition surface of the telescopic camera turns from the first surface to the second surface, the P-sensor corresponding to the second surface is activated to keep the sensing surface of the P-sensor and the image acquisition surface of the image acquisition component face the same surface, so that the determination regarding whether there is an obstacle on each surface may be more accurate, and a probability that the camera moves out mistakenly is reduced. In another embodiment, when the P-sensor facing the same surface as the image acquisition surface of the telescopic camera is activated, the other P-sensor may be correspondingly turned off to reduce power consumption of the terminal.

The P-sensor may be a sensor originally used to detect whether a user gets close to the mobile terminal for communication. The image acquisition surface of the image acquisition component is a surface, from which the image acquisition component moves out of the terminal, of the image acquisition component. Taking the P-sensor to be an infrared P-sensor as an example, since the P-sensor is an active infrared sensor, a sensing surface of the P-sensor is a receiving surface of the P-sensor for receiving the emitted infrared rays. Based on influence of characteristics, particularly directivity and transmittance, of an infrared ray, the sensing surface of the P-sensor and the image acquisition surface of the image acquisition component are required to face the same side, so as to enable the sensing surface of the P-sensor and the image acquisition surface on the same surface, so that the determination regarding whether there is an obstacle on each surface may be more accurate, the misoperation probability is further reduced, and control accuracy of the image acquisition component is improved.

Figure 7:
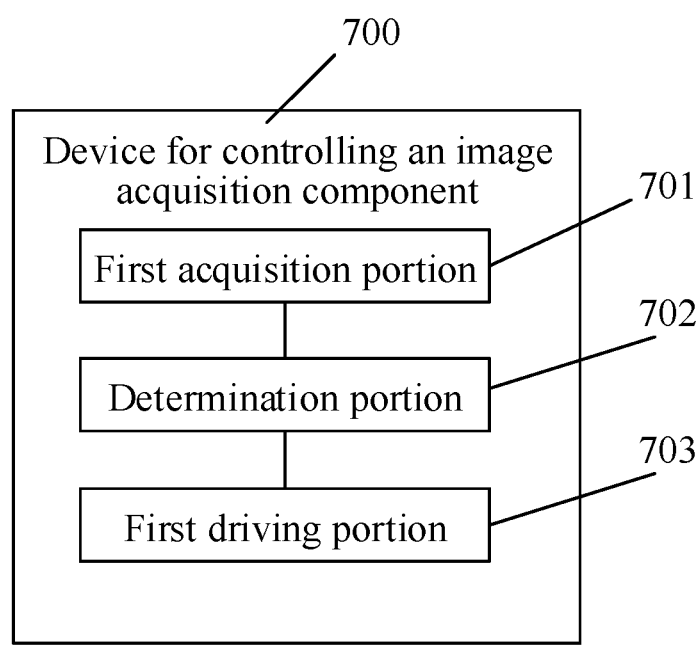
FIG. 7 is a first block diagram of a device for controlling an image acquisition component according to some embodiments of the present disclosure.

FIG. 7 is a first block diagram of a device for controlling an image acquisition component, according to some embodiments of the present disclosure. As illustrated in FIG. 7, the device for controlling an image acquisition component 700 mainly includes a first acquisition portion 701, a determination portion 702 and a first driving portion 703.

The first acquisition portion 701 is configured to obtain, when a terminal including a movable image acquisition component receives an activating instruction for the image acquisition component, acquired data acquired by a P-sensor. The image acquisition component may be capable of moving in and out of the terminal under driving of a driving component of the terminal.

The determination portion 702 is configured to determine whether there is an obstacle in a preset range of the terminal based on the acquired data.

The first driving portion 703 is configured to, when there is the obstacle in the preset range of the terminal, forbid the activating instruction to be executed and keep the image acquisition component at a first position in the terminal.

Figure 8:
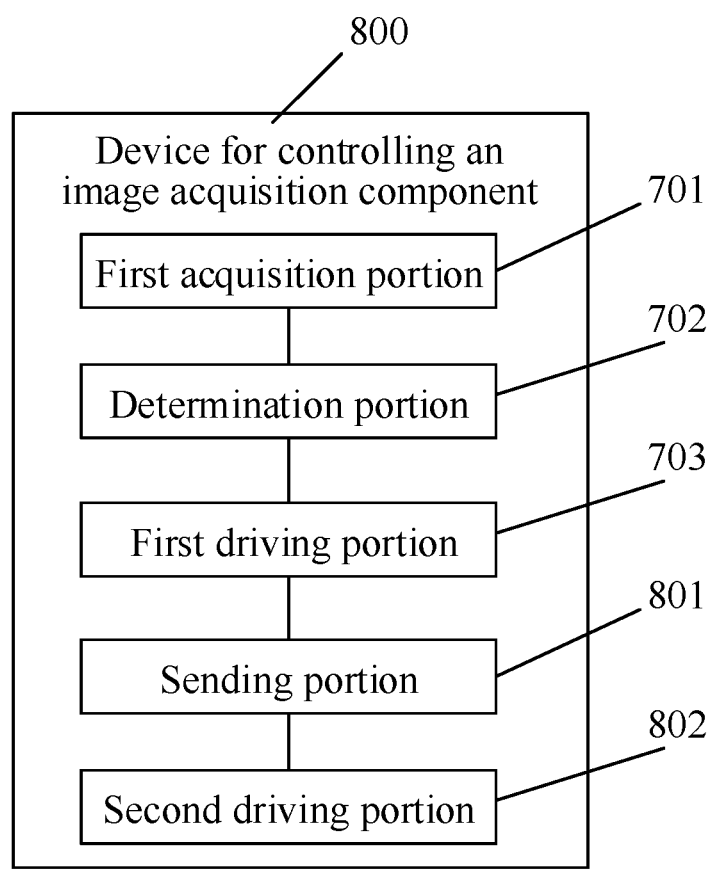
FIG. 8 is a second block diagram of a device for controlling an image acquisition component according to some embodiments of the present disclosure.

FIG. 8 is a second block diagram of a device for controlling an image acquisition component, according to some embodiments of the present disclosure. As illustrated in FIG. 8, the device for controlling an image acquisition component 800 mainly includes a first acquisition portion 701, a determination portion 702, a first driving portion 703, a sending portion 801 and a second driving portion 802.

The first acquisition portion 701 is configured to obtain, when a terminal including a movable image acquisition component receives an activating instruction for the image acquisition component, acquired data acquired by a P-sensor. The image acquisition component may be capable of moving in and out of the terminal under driving of a driving component of the terminal.

The determination portion 702 is configured to determine whether there is an obstacle in a preset range of the terminal based on the acquired data.

The first driving portion 703 is configured to, when there is the obstacle in the preset range of the terminal, forbid the activating instruction to be executed and keep the image acquisition component at a first position in the terminal.

The sending portion 801 is configured to send, when there is no obstacle in the preset range of the terminal, the activating instruction to the driving component.

The second driving portion 802 is configured to drive the image acquisition component through the driving component based on the activating instruction to move from the first position in the terminal to a second position outside the terminal.

Figure 9:
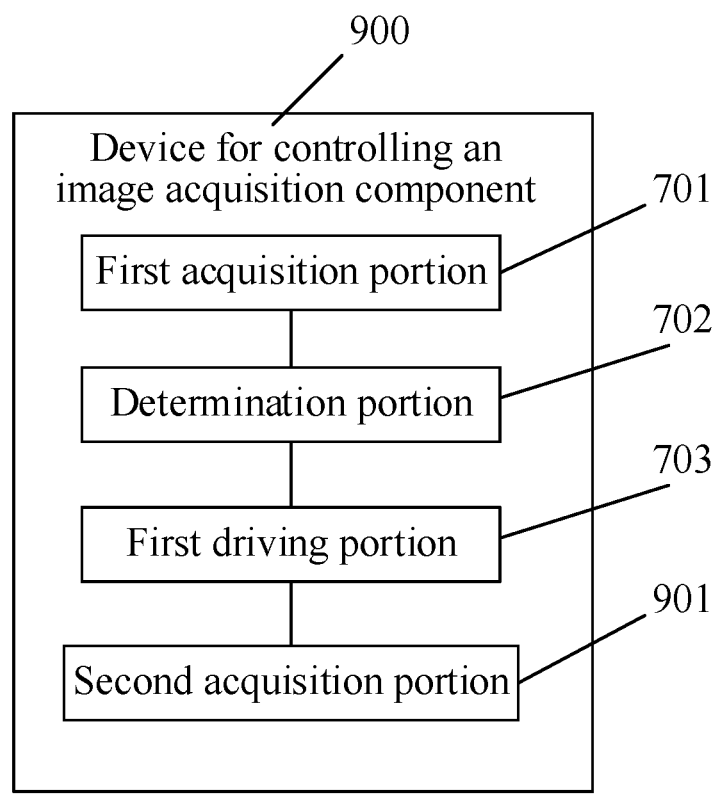
FIG. 9 is a third block diagram of a device for controlling an image acquisition component according to some embodiments of the present disclosure.

FIG. 9 is a third block diagram of a device for controlling an image acquisition component, according to some embodiments of the present disclosure. As illustrated in FIG. 9, the device for controlling an image acquisition component 900 mainly includes a first acquisition portion 701, a determination portion 702, a first driving portion 703 and a second acquisition portion 901.

The first acquisition portion 701 is configured to obtain, when a terminal including a movable image acquisition component receives an activating instruction for the image acquisition component, acquired data acquired by a P-sensor. The image acquisition component may be capable of moving in and out of the terminal under driving of a driving component of the terminal.

The determination portion 702 is configured to determine whether there is an obstacle in a preset range of the terminal based on the acquired data.

The first driving portion 703 is configured to, when there is the obstacle in the preset range of the terminal, forbid the activating instruction to be executed and keep the image acquisition component at a first position in the terminal.

The second acquisition portion 901 is configured to obtain, when there is the obstacle in the preset range of the terminal, a brightness parameter acquired by a light sensor.

The first driving portion 703 is specifically configured to, when the brightness parameter is less than a preset brightness threshold, forbid the activating instruction to be executed and keep the image acquisition component at a first position in the terminal.

Figure 10:
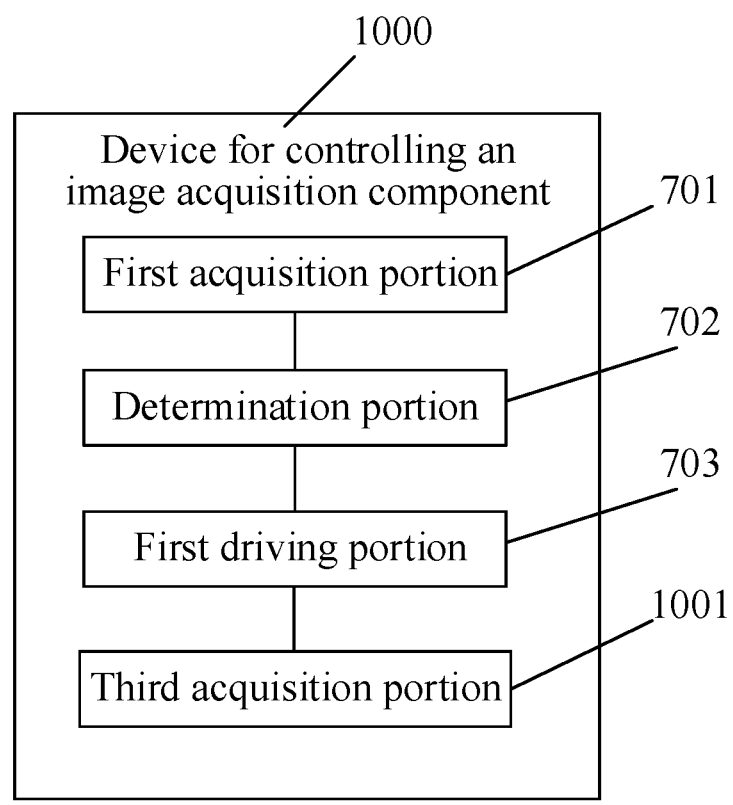
FIG. 10 is a fourth block diagram of a device for controlling an image acquisition component according to some embodiments of the present disclosure.

FIG. 10 is a fourth block diagram of a device for controlling an image acquisition component, according to some embodiments of the present disclosure. As illustrated in FIG. 10, the device for controlling an image acquisition component 1000 mainly includes a first acquisition portion 701, a determination portion 702, a first driving portion 703 and a third acquisition portion 1001.

The first acquisition portion 701 is configured to obtain, when a terminal including a movable image acquisition component receives an activating instruction for the image acquisition component, acquired data acquired by a P-sensor. The image acquisition component may be capable of moving in and out of the terminal under driving of a driving component of the terminal.

The determination portion 702 is configured to determine whether there is an obstacle in a preset range of the terminal based on the acquired data.

The first driving portion 703 is configured to, when there is the obstacle in the preset range of the terminal, forbid the activating instruction to be executed and keep the image acquisition component at a first position in the terminal.

The third acquisition portion 1001 is configured to obtain, when there is the obstacle in the preset range of the terminal, stay time of the obstacle within the preset range.

The first driving portion 703 is specifically configured to, when the stay time is greater than a preset time threshold, forbid the activating instruction to be executed and keep the image acquisition component at a first position in the terminal.

In some embodiments, the first acquisition portion 701 may include a P-sensor and a driving service.

The P-sensor is configured to perform data acquisition in the preset range of the terminal to obtain the acquired data and send the acquired data to a sensor hub service.

The driving service is configured to obtain the acquired data from the sensor hub service and determine whether there is the obstacle in the preset range of the terminal based on the acquired data.

In some embodiments, the terminal may include at least two P-sensors of which orientations of sensing surfaces are different, and the device may further include a first activating portion and a second activating portion.

The first activating portion is configured to activate, when an image acquisition surface of the image acquisition component faces a first surface, the P-sensor corresponding to the first surface.

The second activating portion is configured to activate, when it is detected that the image acquisition surface of the image acquisition component turns from the first surface to a second surface, the P-sensor corresponding to the second surface, to keep the sensing surface of the P-sensor and the image acquisition surface of the image acquisition component face the same surface.

With respect to the devices in the above embodiments, the specific manners in which the portions perform operations have been described in detail in the method embodiments, which will not be elaborated herein.

Correspondingly, the present disclosure also provides a device for controlling an image acquisition component, which includes a processor and a memory configured to store an instruction executable for the processor. The processor is configured to implement operations of any method for controlling an image acquisition component in the abovementioned embodiments. In an implementation, the processor may implement the functions of the first acquisition portion 701, the determination portion 702, the second acquisition portion 901 and he third acquisition portion 1001. In another embodiment, the device may further include an output interface and a driving component. The output interface may implement the function of the sending portion 801, and the driving component may implement the functions of a first driving portion 703 and a second driving portion 802.

Figure 11:
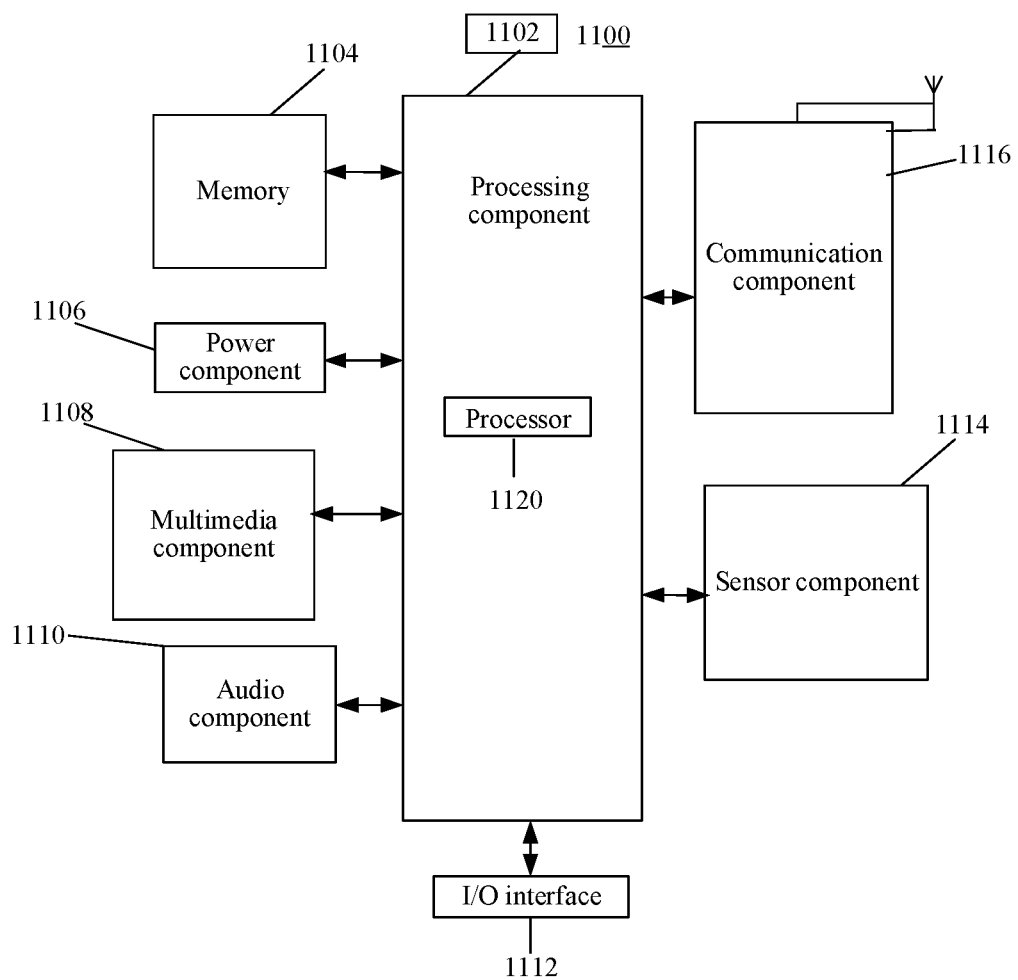
FIG. 11 is a block diagram of a device for controlling an image acquisition component, according to some embodiments of the present disclosure.

FIG. 11 is a block diagram of a device for controlling an image acquisition component 1100, according to some embodiments of the present disclosure. For example, the device 1100 may be a mobile phone, a computer, a digital broadcast terminal, a messaging device, a gaming console, a tablet, a medical device, exercise equipment, a personal digital assistant and the like.

Referring to FIG. 11, the device 1100 may include one or more of the following components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the blocks in the abovementioned methods. Moreover, the processing component 1102 may further include one or more portions which facilitate interaction between the processing component 1102 and the other components. For instance, the processing component 1102 may include a multimedia portion to facilitate interaction between the multimedia component 1108 and the processing component 1102.

The memory 1104 is configured to store various types of data to support the operations of the device 1100. Examples of such data include instructions for any APPs or methods operated on the device 1100, contact data, phonebook data, messages, pictures, video, etc. The memory 1104 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 provides power for various components of the device 1100. The power component 1106 may include a power management system, one or more power supplies, and other components associated with generation, management and distribution of power for the device 1100.

The multimedia component 1108 includes a screen providing an output interface between the device 1100 and a user. In some embodiments, the screen may include a Liquid Crystal Display (LCD) and a Touch Panel (TP). In some embodiments, an organic light-emitting diode (OLED) display or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and/or the rear camera may be a fixed optical lens system or have focusing and optical zooming capabilities.

The audio component 1110 is configured to output and/or input an audio signal. For example, the audio component 1110 includes a Microphone (MIC), and the MIC is configured to receive an external audio signal when the device 1100 is in the operation mode, such as a call mode, a recording mode and a voice recognition mode. The received audio signal may further be stored in the memory 1104 or sent through the communication component 1116. In some embodiments, the audio component 1110 further includes a speaker configured to output the audio signal.

The I/O interface 1112 provides an interface between the processing component 1102 and a peripheral interface portion, and the peripheral interface portion may be a keyboard, a click wheel, a button and the like. The button may include, but not limited to: a home button, a volume button, a starting button and a locking button.

The sensor component 1114 includes one or more sensors configured to provide status assessment in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a P-sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging APP. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and other equipment. The device 1100 may access a communication-standard-based wireless network, such as a Wireless Fidelity (Wi-Fi) network, a 2nd-Generation (2G), a 3rd-Generation (3G), a $4^{th}$-Generation (4G), or a $5^{th}$-Generation (5G) network or a combination thereof. In some embodiments of the present disclosure, the communication component 1116 receives a broadcast signal or broadcast associated information from an external broadcast management system through a broadcast channel. In some embodiments of the present disclosure, the communication component 1116 further includes a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology or another technology.

In some embodiments of the present disclosure, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 1104 including an instruction, and the instruction may be executed by the processor 1120 of the device 1100 to implement the abovementioned methods. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

It is noted that the various portions, sub-portions, units, and components in the present disclosure can be implemented using any suitable technology. For example, a portion may be implemented using circuitry, such as an integrated circuit (IC). As another example, a portion may be implemented as a processing circuit executing software instructions.

Correspondingly, the present disclosure also provides a non-transitory computer-readable storage medium is provided. An instruction in the storage medium may be executed by a processor of a device for controlling an image acquisition component to enable the device to execute the method for controlling an image acquisition component in the abovementioned embodiments. The method may include the following operations.

When a terminal including a movable image acquisition component receives an activating instruction for the image acquisition component, acquired data acquired by a P-sensor is obtained, the image acquisition component being capable of moving in and out of the terminal under driving of a driving component of the terminal.

It is determined whether there is an obstacle in a preset range of the terminal based on the acquired data.

When there is the obstacle in the preset range of the terminal, the activating instruction is forbidden to be executed, and the image acquisition component is kept at a first position in the terminal.

Other implementations of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other types of monitors for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for controlling an image acquisition component, comprising:
   responsive to that a terminal comprising a movable image acquisition component receives an activating instruction for the image acquisition component, obtaining acquired data acquired by a proximity sensor (P-sensor), the image acquisition component being capable of moving in and out of the terminal under driving of a driving component of the terminal;
   determining whether there is an obstacle in a preset range of the terminal based on the acquired data; and;
   in a case that there is the obstacle in the preset range of the terminal, forbidding the activating instruction to be executed, and keeping the image acquisition component at a first position in the terminal,
   wherein the method further comprises:
   in a case that there is the obstacle in the preset range of the terminal, obtaining a brightness of a present environment in the preset range of the terminal, which is acquired by a light sensor,
   wherein the forbidding the activating instruction to be executed and keeping the image acquisition component at the first position in the terminal in a case that there is the obstacle in the preset range of terminal comprises:
   responsive to that the brightness is less than a preset brightness threshold, forbidding the activating instruction to be executed and keeping the image acquisition component at the first position in the terminal.

2. The method of claim 1, further comprising:
   in a case that there is no obstacle in the preset range of the terminal, sending the activating instruction to the driving component; and
   driving, by the driving component based on the activating instruction, the image acquisition component to move from the first position in the terminal to a second position outside the terminal.

3. The method of claim 1, further comprising:
   responsive to that the brightness is greater than the preset brightness threshold, sending the activating instruction to the driving component; and
   driving, by the driving component based on the activating instruction, the image acquisition component to move from the first position in the terminal to a second position outside the terminal.

4. The method of claim 1, further comprising:
   in a case that there is the obstacle in the preset range of the terminal, obtaining stay time of the obstacle within the preset range;
   wherein the forbidding the activating instruction to be executed and keeping the image acquisition component at the first position in the terminal in a case that there is the obstacle in the preset range of the terminal comprises:
   responsive to that the stay time is greater than a preset time threshold, forbidding the activating instruction to be executed and keeping the image acquisition component at the first position in the terminal.

5. The method of claim 1, wherein obtaining the acquired data acquired by the P-sensor comprises:
   performing, by the P-sensor, data acquisition in the preset range of the terminal to obtain the acquired data;
   sending, by the P-sensor, the acquired data to a sensor hub service; and
   obtaining, by a driving service, the acquired data from the sensor hub service;
   wherein the determining whether there is the obstacle in the preset range of the terminal based on the acquired data comprises:
   determining, by the driving service based on the acquired data, whether there is the obstacle in the preset range of the terminal.

6. The method of claim 1, wherein the terminal comprises at least two P-sensors of which orientations of sensing surfaces are different, and the method further comprises:
   in a case that an image acquisition surface of the image acquisition component faces a first surface, activating the P-sensor corresponding to the first surface; and
   responsive to that it is detected that the image acquisition surface of the image acquisition component turns from the first surface to a second surface, activating the P-sensor corresponding to the second surface to keep the sensing surface of the P-sensor and the image acquisition surface of the image acquisition component face the same surface.

7. A device for controlling an image acquisition component, comprising:
   a processor; and
   a memory configured to store an instruction executable for the processor;

wherein the processor is configured to:
obtain, responsive to that a terminal comprising a movable image acquisition component receives an activating instruction for the image acquisition component, acquired data acquired by a proximity sensor (P-sensor), the image acquisition component being capable of moving in and out of the terminal under driving of a driving component of the terminal;
determine whether there is an obstacle in a preset range of the terminal based on the acquired data; and
in a case that there is the obstacle in the preset range of the terminal, forbid the activating instruction to be executed and keep the image acquisition component at a first position in the terminal,
wherein the processor is further configured to:
obtain, in a case that there is the obstacle in the preset range of the terminal, a brightness of a present environment in the preset range of the terminal, which is acquired by a light sensor; and
responsive to that the brightness is less than a preset brightness threshold, forbid the activating instruction to be executed and keep the image acquisition component at the first position in the terminal.

8. The device of claim 7, further comprising a driving component, the driving component comprising a motor,
wherein the processor is configured to send, in a case that there is no obstacle in the preset range of the terminal, the activating instruction to the driving component; and
the driving component is configured to drive the image acquisition component based on the activating instruction to move from the first position in the terminal to a second position outside the terminal.

9. The device of claim 7, further comprising a driving component, the driving component comprising a motor,
wherein the processor is configured to send, responsive to that the brightness is greater than the preset brightness threshold, the activating instruction to the driving component; and
the driving component is configured to drive the image acquisition component based on the activating instruction to move from the first position in the terminal to a second position outside the terminal.

10. The device of claim 7, wherein the processor is configured to:
obtain, in a case that there is the obstacle in the preset range of the terminal, stay time of the obstacle within the preset range; and
responsive to that the stay time is greater than a preset time threshold, forbid the activating instruction to be executed and keep the image acquisition component at the first position in the terminal.

11. The device of claim 7,
the P-sensor is configured to perform data acquisition in the preset range of the terminal to obtain the acquired data and send the acquired data to a sensor hub service; and
the device furher comprises a driving service, configured to obtain the acquired data from the sensor hub service and determine whether there is the obstacle in the preset range of the terminal based on the acquired data.

12. The device of claim 7, wherein the terminal comprises at least two P-sensors of which orientations of sensing surfaces are different, and the processor is configured to:
activate, responsive to that an image acquisition surface of the image acquisition component faces a first surface, the P-sensor corresponding to the first surface; and activate, responsive to that it is detected that the image acquisition surface of the image acquisition component turns from the first surface to a second surface, the P-sensor corresponding to the second surface to keep the sensing surface of the P-sensor and the image acquisition surface of the image acquisition component face the same surface.

13. A non-transitory computer-readable storage medium, an instruction in the storage medium being executed by a processor of a device for controlling an image acquisition component to enable the device to implement a method for controlling an image acquisition component, the method comprising:
responsive to that a terminal comprising a movable image acquisition component receives an activating instruction for the image acquisition component, obtaining acquired data acquired by a proximity sensor (P-sensor), the image acquisition component being capable of moving in and out of the terminal under driving of a driving component of the terminal;
determining whether there is an obstacle in a preset range of the terminal based on the acquired data; and
in a case that there is the obstacle in the preset range of the terminal, forbidding the activating instruction to be executed, and keeping the image acquisition component at a first position in the terminal,
wherein the method further comprises:
in a case that there is the obstacle in the preset range of the terminal, obtaining a brightness of a present environment in the preset range of the terminal, which is acquired by a light sensor,
wherein the forbidding the activating instruction to be executed and keeping the image acquisition component at the first position in the terminal in a case that there is the obstacle in the preset range of terminal comprises:
responsive to that the brightness is less than a preset brightness threshold, forbidding the activating instruction to be executed and keeping the image acquisition component at the first position in the terminal.

14. The non-transitory computer-readable storage medium of claim 13, wherein the method further comprises:
in a case that there is no obstacle in the preset range of the terminal, sending the activating instruction to the driving component; and
driving, by the driving component based on the activating instruction, the image acquisition component to move from the first position in the terminal to a second position outside the terminal.

15. The non-transitory computer-readable storage medium of claim 13, wherein the method further comprises:
in a case that there is the obstacle in the preset range of the terminal, obtaining stay time of the obstacle within the preset range;
wherein the forbidding the activating instruction to be executed and keeping the image acquisition component at the first position in the terminal in a case that there is the obstacle in the preset range of the terminal comprises:
responsive to that the stay time is greater than a preset time threshold, forbidding the activating instruction to be executed and keeping the image acquisition component at the first position in the terminal.

16. The non-transitory computer-readable storage medium of claim 13, wherein obtaining the acquired data acquired by the P-sensor comprises:

performing, by the P-sensor, data acquisition in the preset range of the terminal to obtain the acquired data;

sending, by the P-sensor, the acquired data to a sensor hub service; and obtaining, by a driving service, the acquired data from the sensor hub service;

wherein determining whether there is the obstacle in the preset range of the terminal based on the acquired data comprises:

determining, by the driving service based on the acquired data, whether there is the obstacle in the preset range of the terminal.

17. The non-transitory computer-readable storage medium of claim 13, wherein the terminal comprises at least two P-sensors of which orientations of sensing surfaces are different, and the method further comprises:

responsive to that an image acquisition surface of the image acquisition component faces a first surface, activating the P-sensor corresponding to the first surface; and responsive to that it is detected that the image acquisition surface of the image acquisition component turns from the first surface to a second surface, activating the P-sensor corresponding to the second surface to keep the sensing surface of the P-sensor and the image acquisition surface of the image acquisition component face the same surface.

\* \* \* \* \*